US011922610B2

United States Patent
Masuda et al.

(10) Patent No.: US 11,922,610 B2
(45) Date of Patent: Mar. 5, 2024

(54) MULTI-EYE CAMERA SYSTEM, MULTI-EYE PHOTOGRAPHING CAMERA HEAD, IMAGE PROCESSING DEVICE, MULTI-EYE PHOTOGRAPHING PROGRAM AND MULTI-EYE PHOTOGRAPHING METHOD

(71) Applicant: KAMUY Innovation Corporation, Sapporo (JP)

(72) Inventors: Takashi Masuda, Sapporo (JP); Katsuji Matsuura, Sapporo (JP)

(73) Assignee: KAMUY Innovation Corporation, Sapporo (JP)

( * ) Notice: Subject to any disclaimer, the term of this patent is extended or adjusted under 35 U.S.C. 154(b) by 596 days.

(21) Appl. No.: 16/982,133

(22) PCT Filed: Mar. 22, 2019

(86) PCT No.: PCT/JP2019/012030
§ 371 (c)(1),
(2) Date: Sep. 18, 2020

(87) PCT Pub. No.: WO2019/182101
PCT Pub. Date: Sep. 26, 2019

(65) Prior Publication Data
US 2021/0097660 A1     Apr. 1, 2021

(30) Foreign Application Priority Data
Mar. 23, 2018   (JP) ................. 2018-055674

(51) Int. Cl.
G06K 9/00        (2022.01)
G06T 5/50        (2006.01)
G06T 7/00        (2017.01)

(52) U.S. Cl.
CPC ............... *G06T 5/50* (2013.01); *G06T 3/403* (2013.01); *G06T 7/97* (2017.01); *G06T 2207/20021* (2013.01)

(58) Field of Classification Search
CPC .. G06T 5/50; G06T 3/403; G06T 7/97; G06T 2207/20021; G06T 3/4038; G06T 3/40;
(Continued)

(56) References Cited

U.S. PATENT DOCUMENTS

2011/0279690 A1* 11/2011 Kuroiwa ............... G06F 3/128
                                                                 348/231.2
2013/0070047 A1*  3/2013 DiGiovanni ... H04N 21/234345
                                                                 348/E7.001
(Continued)

FOREIGN PATENT DOCUMENTS

WO        2014/192487 A1    12/2014

*Primary Examiner* — Andrew M Moyer
(74) *Attorney, Agent, or Firm* — Muncy, Geissler, Olds & Lowe, P.C.

(57) ABSTRACT

A multi-eye camera system includes multi-eye photographing camera heads 2 and image processing device 3 to which a plurality of the multi-eye photographing camera heads 2 are connected. Each of the multi-eye photographing camera heads 2 is provided with partial image acquiring part 24, parameter memory part 23 and image correcting part 26. Image processing device 3 is provided with input processing part 31, resizing processing part 32 and whole image memory 33.

8 Claims, 6 Drawing Sheets

(58) Field of Classification Search
CPC ........ G06T 5/001; H04N 23/69; H04N 23/00; H04N 23/698; H04N 23/80; H04N 23/957; G03B 15/00; G03B 19/07
See application file for complete search history.

(56) References Cited

U.S. PATENT DOCUMENTS

| | | | | |
|---|---|---|---|---|
| 2013/0258048 | A1* | 10/2013 | Wang | H04N 1/407 |
| | | | | 348/38 |
| 2014/0254681 | A1* | 9/2014 | Aminlou | H04N 19/187 |
| | | | | 375/240.16 |
| 2014/0300692 | A1* | 10/2014 | Lablans | H04N 5/2628 |
| | | | | 348/38 |

* cited by examiner

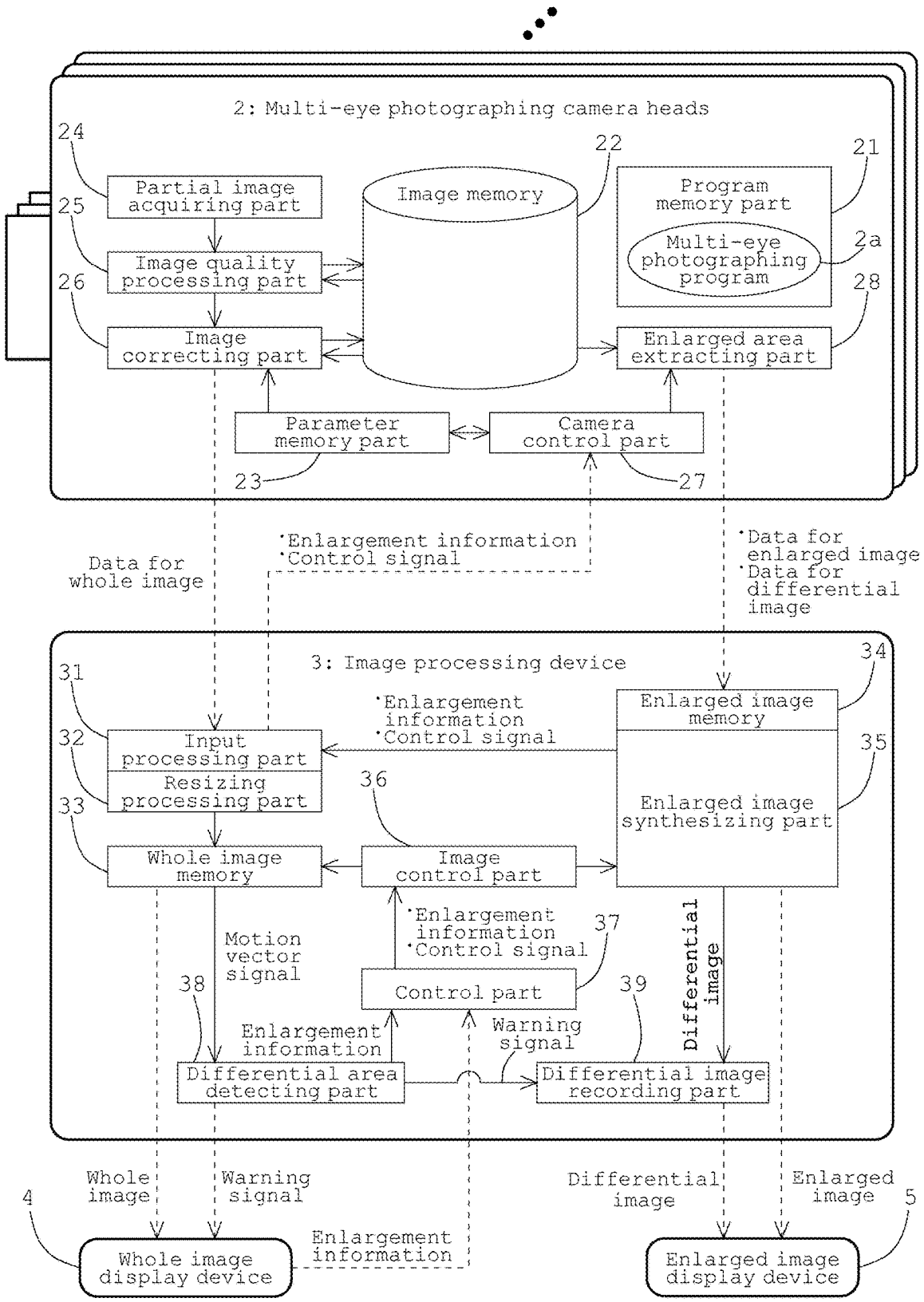
[Fig. 1]

[Fig. 2]
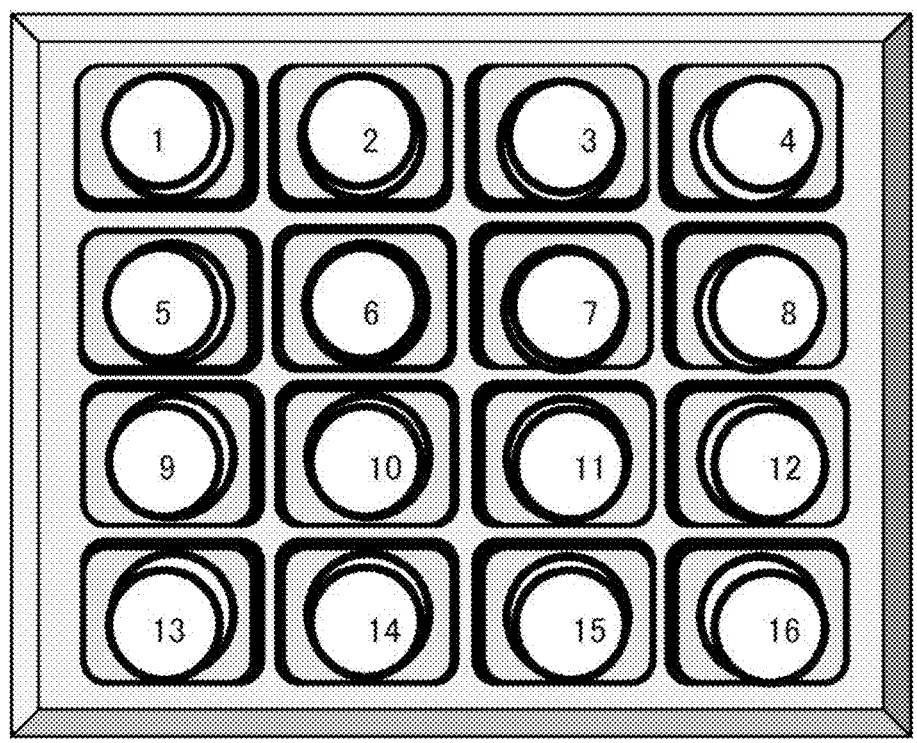

[Fig. 3]
(a)
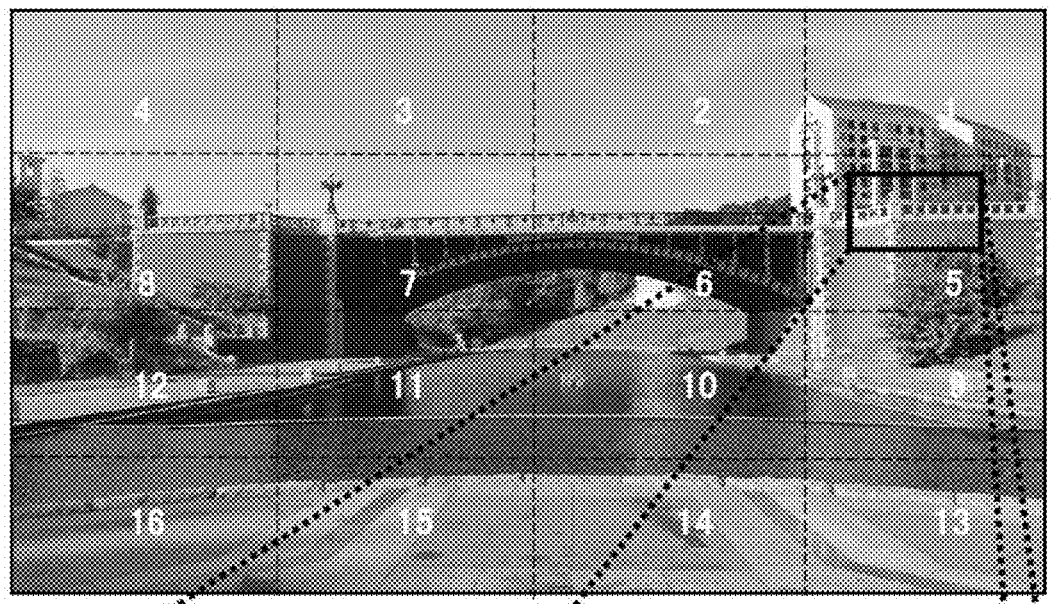
(b)

[Fig. 4]
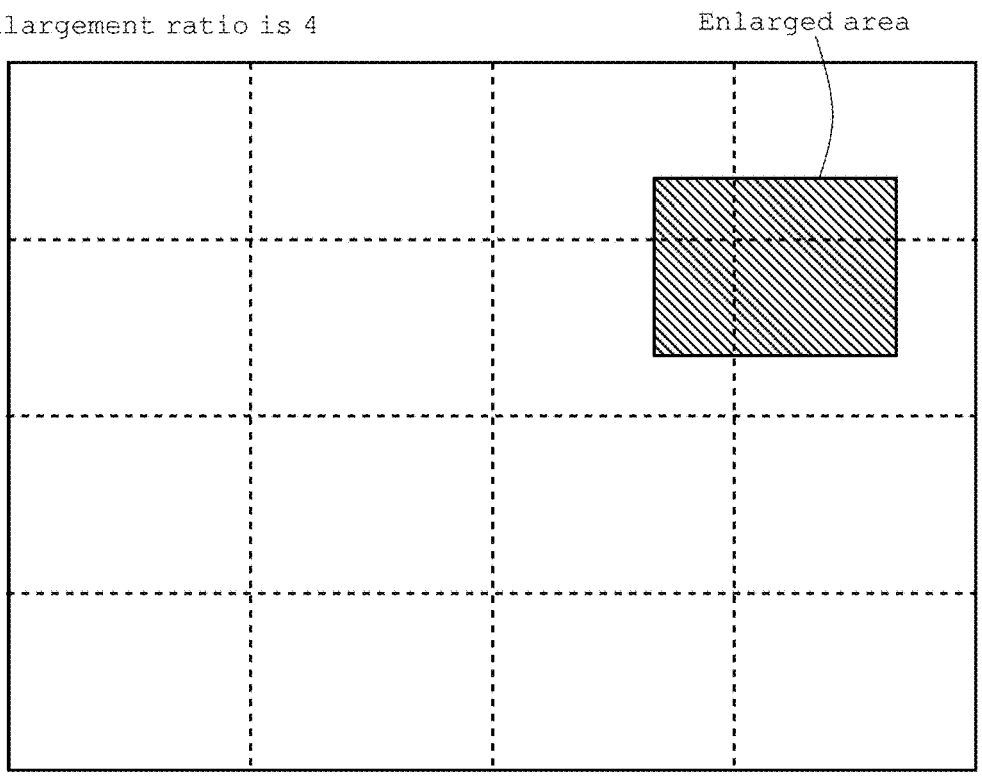
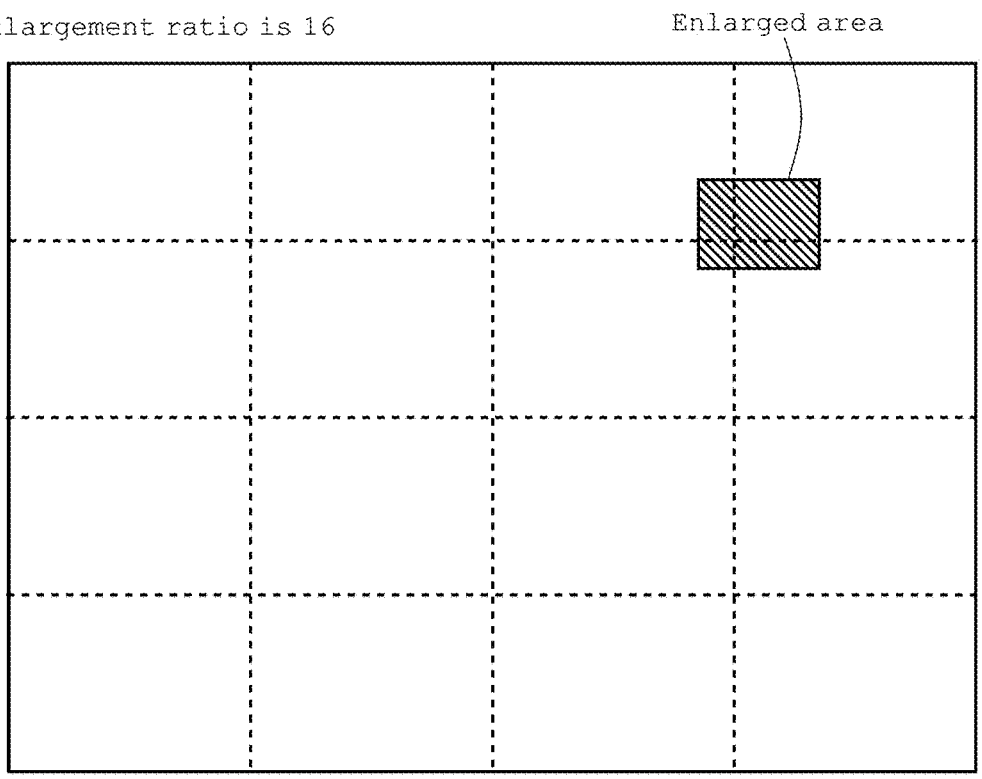

[Fig. 5]
(a) One unit
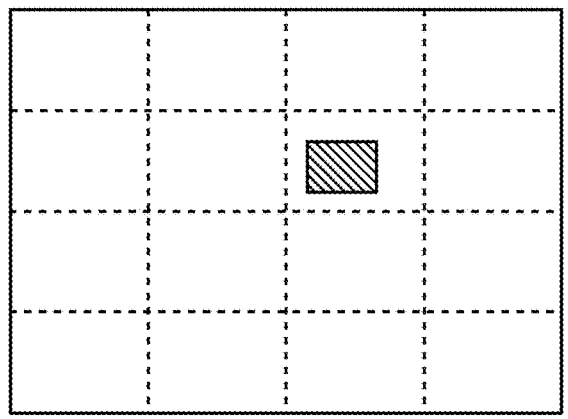
(b) Two units
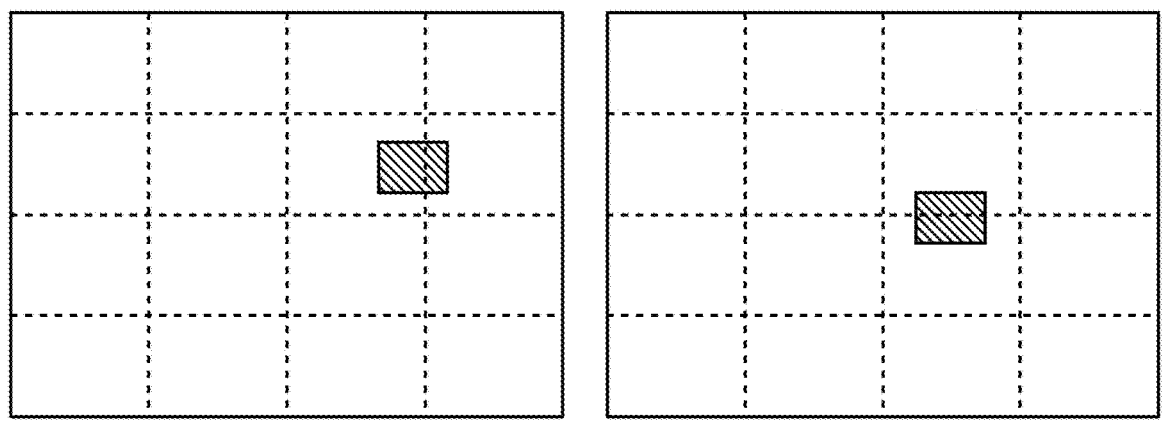
(c) Four units
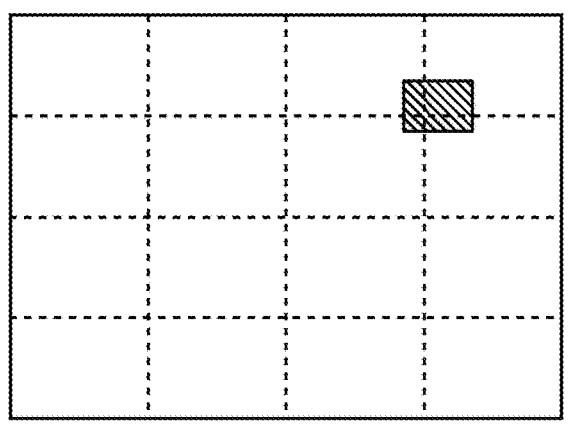

[Fig. 6]
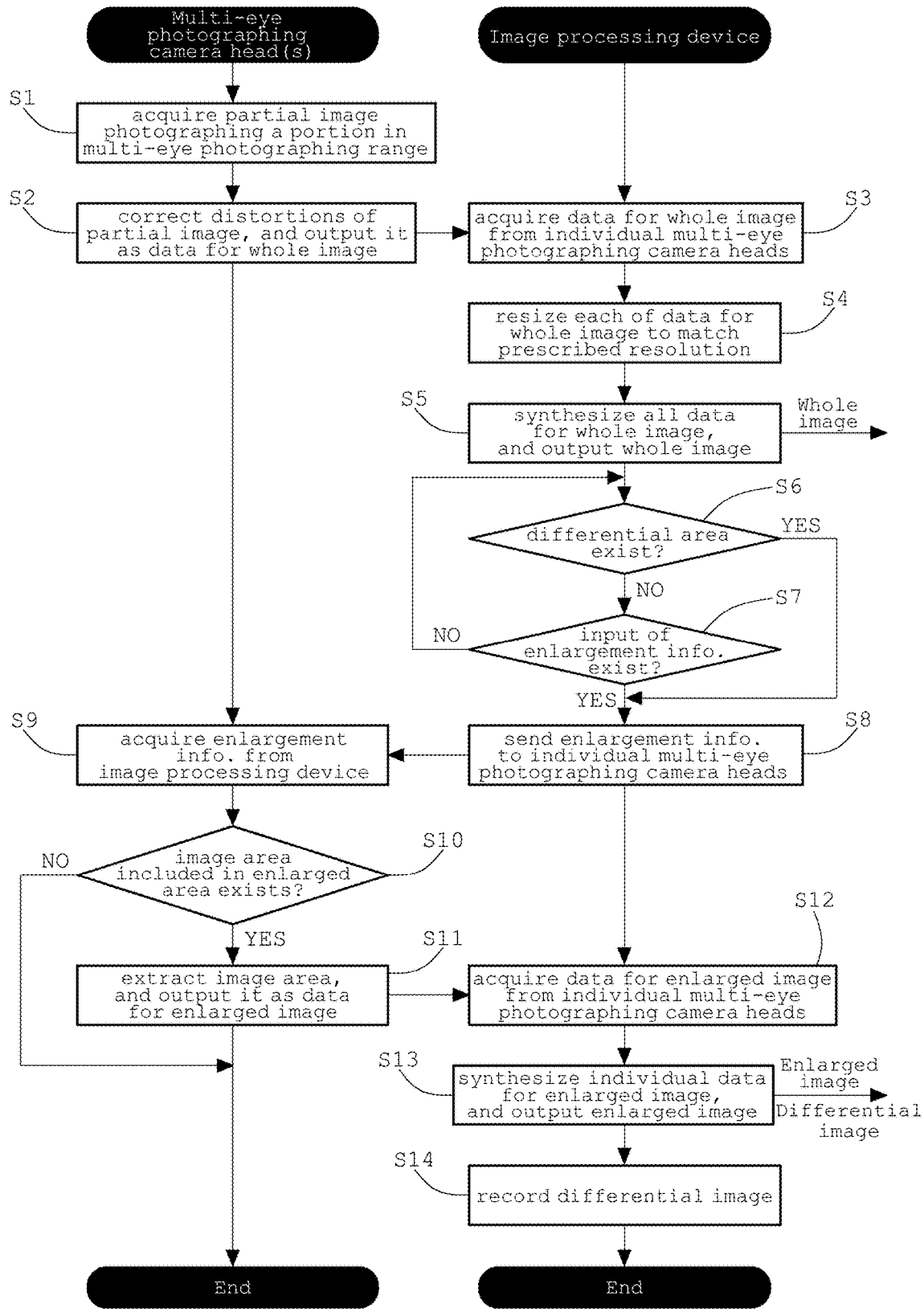

MULTI-EYE CAMERA SYSTEM, MULTI-EYE PHOTOGRAPHING CAMERA HEAD, IMAGE PROCESSING DEVICE, MULTI-EYE PHOTOGRAPHING PROGRAM AND MULTI-EYE PHOTOGRAPHING METHOD

TECHNOLOGY FIELD

This invention relates to a multi-eye camera system, multi-eye photographing camera heads, an image processing device, a multi-eye photographing program, and a multi-eye photographing method used for multi-eye photography.

BACKGROUND

In recent years, high-resolution cameras having 4K resolution etc. have been made commercially available, and their application to monitoring cameras and industrial cameras requiring a wide-angle and high-resolution image is expected. However, due to reasons such as expensive parts, large instrument size, and slow processing speed, they have not gained widespread use. Then, proposed is a multi-eye camera system that simultaneously photographs a wide-range photographing area using plural single-eye camera heads and generates a whole image by joining them through image processing.

As such a multi-eye camera system as mentioned above, for example, disclosed in International Publication 2014/192487 is a multi-eye imaging system that acquires a desired image output using images acquired from plural imaging elements (Patent Document 1).

However, in such a multi-eye camera system as mentioned above, if the plural camera heads are arranged on a plane or cylindrically-curved surface, as far as normal lenses are used, images photographed by the individual camera heads have different perspectives. Therefore, even if the individual images are joined as they are, the joined parts do not become continuous due to distortions at both ends of each image, which is a problem.

Then, conventionally performed is a process to correct a linearity distortion by projecting individual images photographed by individual camera heads onto a virtual sphere and matching the center points of the individual images with the center of the virtual sphere. Also, performed simultaneously with that process is a process to correct distortions inherent to lenses installed in the individual camera heads. Because distortions of the individual images are corrected by these correction processes, the joined parts become continuous, acquiring a whole image without sense of incongruity.

PRIOR ART DOCUMENT(S)

Patent Document(s)

[Patent Doc. 1] International Patent Publication 2014/192487

SUMMARY OF THE INVENTION(S)

Subject(s) to be Solved by the Invention(s)

However, in a conventional multi-eye camera system, the above-mentioned various correction processes are performed in the side of an image processing device connected to plural camera heads. Therefore, as the number of the camera heads used increases, a processing load on the image processing device increases, and the processing speed slows down, which is a problem.

Also, in a conventional image processing device, individual images outputted from all the camera heads are tentatively written into frame memory in their original resolution. Therefore, as the number of the camera heads used or the resolution of the cameras increases, the memory capacity required of the frame memory increases, increasing the size of the image processing device and causing increases in consumed power and parts cost, which is a problem.

Furthermore, because of the memory capacity mentioned above, in designing a multi-eye camera system, the maximum processable number of camera heads must be supposed. Therefore, in a conventional multi-eye camera system, it is difficult to optimize the multi-eye camera system matching that number of camera heads, which is a problem.

This invention has been made for solving such a problem, and its objective is to offer a multi-eye camera system, multi-eye photographing camera heads, an image processing device, a multi-eye photographing program, and a multi-eye photographing method that can reduce the processing load of an image processing device, allowing miniaturization, power saving, and cost reduction, and can easily optimize the whole system.

Means to Solve Subject(s)

In order to reduce the processing load of an image processing device, allowing miniaturization, power saving, and cost reduction, and be able to easily optimize the whole system, a multi-eye camera system, related to the present invention, includes multi-eye photographing camera heads that are used for multi-eye photography, and an image processing device to which a plurality of the multi-eye photographing camera heads are connected, wherein the multi-eye photographing camera head is provided with a partial image acquiring part that acquires a partial image photographing prescribed part in a multi-eye photographing range, parameter memory part that stores correction parameters, which is determined according to an attaching position of the multi-eye photographing camera head, and is used to correct distortions of the partial image, and an image correcting part that corrects distortions of the partial image using the correction parameters, and outputs it as data for whole image that constitute part of a whole image, and the image processing device is provided with an input processing part that acquires the data for whole image corrected by the image correcting part from all the connected multi-eye photographing camera heads, a resizing processing part that resizes all the data for whole image acquired by the input processing part to match the resolution of a whole image display device, and a whole image memory that synthesizes all the data for whole image resized by the resizing processing part, and outputs them as the whole image to the whole image display device.

Further, in order to realize to reduce a required capacity of the enlarged image memory without degrading the enlarged image quality, as an embodiment of the multi-eye camera system related to the present invention, the multi-eye photographing camera head may be further provided with a camera control part that acquires enlargement information specifying an enlarged area in the whole image from the image processing device according to an instruction to display an enlarged part of the whole image, and an enlarged area extracting part that extracts an image area included in the enlarged area among the data for whole image based on the enlargement information, and outputs it as data for enlarged image that constitute a part or the whole of an enlarged image, and the image processing device is further provided with an enlarged image memory that acquires the data for enlarged image from one or more of the multi-eye photographing camera heads, and an enlarged image synthesizing part that synthesizes the data for enlarged image acquired by the enlarged image memory, and outputs them as the enlarged image to an enlarged image display device.

In order to reduce the processing load of an image processing device, allowing miniaturization, power saving, and cost reduction, and be able to easily optimize the whole system, a multi-eye photographing camera head used for multi-eye photography, related to the present invention, includes a partial image acquiring part that acquires a partial image photographing prescribed part in a multi-eye photographing range, a parameter memory part that stores correction parameters, which is determined according to the attaching position of the multi-eye photographing camera head and is used to correct distortions of the partial image, and an image correcting part that corrects distortions of the partial image using the correction parameters, and outputs it as data for whole image that constitute part of a whole image.

Further, in order to realize to reduce a required capacity of the enlarged image memory without degrading the enlarged image quality, as an embodiment of the multi-eye photographing camera head related to the present invention, it may include a camera control part that acquires enlargement information specifying an enlarged area in a whole image from an image processing device that outputs the whole image by synthesizing plural pieces of the data for whole image, and an enlarged area extracting part that extracts an image area included in the enlarged area among the data for whole image based on the enlargement information, and outputs it as data for enlarged image that constitute part or the whole of an enlarged image.

In order to reduce the processing load of an image processing device, allowing miniaturization, power saving, and cost reduction, and be able to easily optimize the whole system, an image processing device related to the present invention, to which a plurality of the multi-eye photographing camera heads are connected, includes an input processing part that acquires the data for whole image corrected by the image correcting part from all the connected multi-eye photographing camera heads, resizing processing part that resizes all the data for whole image acquired by the input processing part to match the resolution of a whole image display device, and a whole image memory that synthesizes all the data for whole image resized by the resizing processing part, and outputs them as the whole image to a whole image display device.

Further, in order to realize to reduce a required capacity of the enlarged image memory without degrading the enlarged image quality, as an embodiment of the image processing device related to the present invention, the image processing device, to which a plurality of the multi-eye photographing camera heads are connected, may include an enlarged image memory that acquires the data for enlarged image from one or more of the multi-eye photographing camera heads, and an enlarged image synthesizing part that synthesizes the data for enlarged image acquired by the enlarged image memory, and outputs them as the enlarged image to an enlarged image display device.

Further, in order to realize automatically detect a differential area and to automatically record its enlarged image, an image processing device related to the present invention, it may include a differential area detecting part that detects a differential area in the whole image based on a motion vector signal of the whole image acquired from the whole image memory, and outputs enlargement information for outputting the differential area as an enlarged differential image to the enlarged area extracting part, and a differential image recording part that acquires and records the differential image when the enlarged area extracting part has outputted an image area included in the differential area among the data for whole image as data for differential image that constitute part or the whole of a differential image based on the enlargement information, and the enlarged image synthesizing part has synthesized the data for differential image and outputted them as the differential image.

In order to reduce the processing load of an image processing device, allowing miniaturization, power saving, and cost reduction, and be able to easily optimize the whole system, a multi-eye photographing program, related to the present invention, used for multi-eye photography that makes a multi-eye photographing camera head function as a partial image acquiring part that acquires a partial image photographing prescribed part in a multi-eye photographing range, a parameter memory part that stores correction parameters, which is determined according to the attaching position of the multi-eye photographing camera head and is used to correct distortions of the partial image, and an image correcting part that corrects distortions of the partial image using the correction parameters and outputs it as data for whole image that constitute part of a whole image.

In order to reduce the processing load of an image processing device, allowing miniaturization, power saving, and cost reduction, and be able to easily optimize the whole system, a multi-eye photographing method, related to the present invention, using a multi-eye photographing camera head used for multi-eye photography, includes a partial image acquisition step to acquire a partial image photographing prescribed part in a multi-eye photographing range, and an image correction step to correct distortions of the partial image using correction parameters, which is determined according to the attaching position of the multi-eye photographing camera head and is used to correct distortions of the partial image, and output it as data for whole image that constitute part of a whole image.

Advantage(s) of the Invention(s)

By this invention, the processing load of an image processing device can be reduced, allowing miniaturization, power saving, and cost reduction, and the whole system can be easily optimized.

BRIEF DESCRIPTIONS OF THE DRAWINGS

FIG. 1 is a whole block diagram showing an embodiment of a multi-eye camera system including multi-eye photographing camera heads and an image processing device of this invention.

FIG. 2 is a diagram showing an example of the array pattern of the multi-eye photographing camera heads in this embodiment.

FIG. 3 is diagram showing examples of (a) a whole image and (b) an enlarged image in this embodiment.

FIG. 4 is a diagram showing enlarged areas when (a) the enlargement ratio is 4, and (b) the enlargement ratio is 16 in this embodiment.

FIG. 5 is a diagram showing cases where an image area included by the enlarged area is (a) inside an image area for one unit of the multi-eye photographing camera head, (b) across image areas for two adjacent units of the multi-eye photographing camera head, and (c) across image areas for four adjacent units of the multi-eye photographing camera head.

FIG. 6 is a flow chart showing main processes of a multi-eye photographing method executed by the multi-eye camera system, the multi-eye photographing camera heads, the image processing device, and the multi-eye photographing program of this embodiment.

EMBODIMENTS OF THE INVENTION(S)

Below, an embodiment of the multi-eye camera system, the multi-eye photographing camera heads, the image processing device, the multi-eye photographing program, and the multi-eye photographing method of this invention is explained referring to drawings.

As shown in FIG. 1, a multi-eye camera system 1 of this embodiment is mainly composed of plural multi-eye photographing camera heads 2 that photograph prescribed parts in a multi-eye photographing range, an image processing device 3 to which these plural multi-eye photographing camera heads 2 are connected, a whole image display device 4 and an enlarged image display device 5 that display a whole image and an enlarged image outputted from this image processing device 3, respectively.

The multi-eye photographing camera heads 2 photograph prescribed parts in the multi-eye photographing range, and cover the whole multi-eye photographing range by arranging plural units in prescribed positions. For example, as shown in FIG. 2, when four units of the multi-eye photographing camera head 2 are arranged in each of the vertical and horizontal directions, by synthesizing partial images photographed by these 16 individual units of multi-eye photographing camera head 2, a whole image covering the whole multi-eye photographing range is acquired as shown in FIG. 3a. Note that a number inside each of the partial images indicates that it was photographed by the multi-eye photographing camera head 2 corresponding to the array number shown in FIG. 2.

In this manner, in the multi-eye camera system 1, photographing the multi-eye photographing range is shared by plural multi-eye photographing camera heads 2. Therefore, as shown in FIG. 3b, when displaying an enlarged image of part of a whole image, its maximum resolution can be increased up to the maximum number of pixels of the partial image photographed by each multi-eye photographing camera head 2. Note that the array pattern of the multi-eye photographing camera heads 2 is not limited to the above-mentioned configuration but can be modified as appropriate. Also, in this invention, an image is a concept that includes both a still image and a moving image.

In this embodiment, each multi-eye photographing camera head 2 comprises a compact digital camera or the like, and as shown in FIG. 1, has a program memory part 21 that stores a multi-eye photographing program 2a, image memory 22 used for image processing, a parameter memory part 23 that stores various parameters, a partial image acquiring part 24 that acquires a partial image, an image quality processing part 25 that processes the image quality of a partial image, an image correcting part 26 that corrects distortions of a partial image, a camera control part 27 that controls the multi-eye photographing camera head 2, and an enlarged area extracting part 28 that extracts an enlarged area.

Note that each multi-eye photographing camera heads 2 has an arithmetic processing means such as a CPU (Central Processing Unit), and a memory means such as ROM (Read Only Memory), RAM (Random Access Memory), and flash memory, other than lenses and an imaging element that are not shown. Then, the multi-eye photographing program 2a executed by the arithmetic processing means makes the memory means function as the program memory part 21, the image memory 22, and the parameter memory part 23, and also makes the arithmetic processing means function as the partial image acquiring part 24, the image quality processing part 25, the image correcting part 26, the camera control part 27, and the enlarged area extracting part 28 mentioned above. Below, the individual components are explained.

Installed in the program memory part 21 is the multi-eye photographing program 2a of this embodiment. The image memory 22 is memory that stores an image for performing image processing. In this embodiment, the image memory 22 is used as a working area while executing image quality processing by the image quality processing part 25 or executing a correction process by the image correcting part 26. In this manner, memory is effectively utilized by making it shared by both the image quality processing and the correction process.

The parameter memory part 23 stores correction parameters for correcting distortions of a partial image photographed by each multi-eye photographing camera head 2. In this embodiment, the correction parameters are determined according to the attaching position of the multi-eye photographing camera head 2, and parameters for correcting a linearity distortion mentioned above and lens-inherent distortions mentioned above are stored in advance.

The partial image acquiring part 24 acquires a partial image that photographed a prescribed part in the multi-eye photographing range from the imaging element. In this embodiment, the partial image acquiring part 24 converts image signals (raw data) outputted from the imaging element into a desired image format, and outputs them as a partial image. Also, the image quality processing part 25 stores the partial image acquired by the partial image acquiring part 24 in the image memory 22, and performs image quality processing to optimize its image quality.

The image correcting part 26 corrects distortions of a partial image whose image quality was processed by the image quality processing part 25. In this embodiment, the image correcting part 26 reads correction parameters from the parameter memory part 23, and corrects a linearity distortion and lens-inherent distortions of the partial image in the image memory 22. Then, the image correcting part 26 outputs the partial image after the corrections to an input processing part 31 of the image processing device 3 as data for whole image that constitute part of a whole image.

The camera control part 27 controls the operation of the multi-eye photographing camera head 2. In this embodiment, as shown in FIG. 1, upon acquiring a control signal from the input processing part 31 of the image processing device 3, the camera control part 27 controls the operation of the multi-eye photographing camera head 2 based on that control signal. Also, upon acquiring enlargement information form the input processing part 31 of the image processing device 3 according to an instruction to display part of a whole image enlarged, the camera control part 27 specifies the enlarged area based on that enlargement information, and judges whether an image area included in that enlargement area exists in data for whole image. Then, as a result of that judgement, if the above-mentioned image area exists, the camera control part 27 controls the enlarged area extracting part 28 to make that image area extracted as an enlarged area.

Note that in this embodiment, the enlargement information is information for specifying the enlarged area in the whole image, and consists of an enlargement position to specify the position to enlarge and an enlargement ratio to specify how much to enlarge. However, the enlargement information is not limited to these but can be any information that can specify the enlarged area.

The enlarged area extracting part 28 extracts an enlarged area from data for whole image. In this embodiment, controlled by the camera control part 27, the enlarged area extracting part 28 judges whether an image area included in the enlarged area exists among data for whole image (partial images after corrections) in the image memory 22 based on the enlargement information. Then, if that image area exists, the enlarged area extracting part 28 extracts that image area, and outputs it to enlarged image memory 34 of the image processing device 3 as data for enlarged image that constitute part or the whole of the enlarged area.

Note that in this embodiment, the image correcting part 26 and the camera control part 27 in the individual multi-eye photographing camera head 2 side and the input processing part 31 in the image processing device 3 side are connected via a broadband transmission route that can transmit an image signal and a control signal. Also, the enlarged area extracting part 28 in the individual multi-eye photographing camera head 2 side and the enlarged image memory 34 in the image processing device 3 side are connected via a data bus. However, the configuration is not limited to this but can be any that can transmit individual signals.

Here, explained is a specific example of the enlarged area specified by the enlargement ratio. In this embodiment, as shown in FIG. 2, 4×4 units of the multi-eye photographing camera head 2 are arranged. Therefore, when the enlargement ratio is set to 4 times, as shown in FIG. 4a, an enlarged area of the same size as the image area for one unit of the multi-eye photographing camera head 2 is specified. Also, when the enlargement ratio is set to 16 times, as shown in FIG. 4b, an enlarged area of vertically and horizontally one quarter in size of the image area for one unit of the multi-eye photographing camera head 2 is specified. In this manner, the enlarged area size is specified by the array pattern of the multi-eye photographing camera heads 2 and the set enlargement ratio.

Note that the minimum value of the enlargement ratio should preferably set so that the specified enlarged area coincides with the image area for one unit of the multi-eye photographing camera head 2. Thereby, the amount of transmission by the data bus becomes at most the number of pixels of one unit of the multi-eye photographing camera head 2, therefore the connection can be made via the data bus of the same frequency band as the broadband transmission route for transmitting data for whole image.

Next, explained is a specific example of the enlarged area specified by the enlargement position. First, as shown in FIG. 5a, if the image area included in the enlarged area exists inside the image area for one unit of the multi-eye photographing camera head 2, that one unit of multi-eye photographing camera head 2 outputs the image area included in the enlarged area. Also, as shown in FIG. 5b, if the image area included in the enlarged area exists across the image areas for two vertically or horizontally adjacent units of the multi-eye photographing camera head 2, each of those two units of multi-eye photographing camera head 2 outputs the image area included in the enlarged area. Furthermore, as shown in FIG. 5c, if the image area included in the enlarged area exists across the image areas for four vertically and horizontally adjacent units of the multi-eye photographing camera head 2, each of those four units of multi-eye photographing camera head 2 outputs the image area included in the enlarged area. In this manner, even when the enlargement ratio is the same, the number of units of the multi-eye photographing camera head 2 that output data for enlarged image varies according to the enlargement position.

The image processing device 3 processes data for whole image and data for enlarged image acquired from the multi-eye photographing camera heads 2. In this embodiment, as shown in FIG. 1, the image processing device 3 mainly has the input processing part 31 that acquires data for whole image from the individual multi-eye photographing camera heads 2, a resizing processing part 32 that resizes the individual data for whole image, a whole image memory 33 that outputs a whole image, the enlarged image memory 34 that acquires data for enlarged image from the individual multi-eye photographing camera heads 2, an enlarged image synthesizing part 35 that outputs an enlarged image, an image control part 36 that controls the outputs of the whole image and the enlarged image, a control part 37 that controls the multi-eye photographing camera heads 2, a differential area detecting part 38 that detects a differential area, and a differential image recording part 39 that records a differential image.

Note that the image processing device 3 is composed of a microcomputer provided with an arithmetic processing means such as a CPU (Central Processing Unit), and a memory means such as ROM (Read Only Memory), RAM (Random Access Memory), and flash memory. Then, a program for the image processing device 3 executed by the arithmetic processing means makes the memory means function as the whole image memory 33 and the enlarged image memory 34, and makes the arithmetic processing means function as the input processing part 31, the resizing processing part 32, the enlarged image synthesizing part 35, the image control part 36, the control part 37, the differential area detecting part 38, and the differential image recording part 39 mentioned above. Below, the individual component parts are explained.

The input processing part 31 acquires data for whole image from the multi-eye photographing camera heads 2. In this embodiment, as shown in FIG. 1, the input processing part 31 acquires data for whole image corrected by the image correcting part 26 from all the multi-eye photographing camera heads 2 connected to the image processing device 3. That is, the data for whole image are in a state where a linearity distortion and lens-inherent distortions that are problematic in joining them as a whole image are already corrected.

Therefore, the input processing part 31 only needs to execute simple processes such as setting addresses for writing data for whole image to the whole image memory 33, and the circuit is greatly simplified compared with a conventional device that performs correction processes in the image processing device 3 side. Also, in this embodiment, as shown in FIG. 1, the input processing part 31 sends enlargement information and a control signal acquired through the enlarged image synthesizing part 35 to the camera control part 27 of each multi-eye photographing camera head 2.

The resizing processing part 32 resizes data for whole image. In this embodiment, the resizing processing part 32 resizes all the data for whole image acquired by the input processing part 31 to match the resolution of the whole image display device 4. Then, the individual data for whole image whose pixels are adjusted for the optimal resolution are written into the whole image memory 33 according to addresses specified by the input processing part 31 and mapped as a whole image.

The whole image memory 33 synthesizes data for whole image, and outputs a whole image. In this embodiment, under the control of the image control part 36, the whole image memory 33 synthesizes all the data for whole image resized by the resizing processing part 32, and outputs them as a whole image to the whole image display device 4. Also, in this embodiment, an image format matching the whole image display device 4 is specified by the image control part 36, and the whole image memory 33 outputs the whole image in that image format.

Furthermore, in this embodiment, the whole image memory 33 is composed of plural pieces of frame memory, where synthesized whole images are sequentially stored in the individual pieces of frame memory according to the time sequence. Then, as shown in FIG. 1, the whole image memory 33 outputs a motion vector signal to the differential area detecting part 38 based on a difference between chronologically adjacent whole images.

The enlarged image memory 34 acquires data for enlarged image from the individual multi-eye photographing camera heads 2. In this embodiment, the enlarged image memory 34 acquires data for enlarged image from the enlarged area extracting part 28 of one or more of multi-eye photographing camera heads 2 having an image area included in the enlarged area among all the multi-eye photographing camera heads 2, and writes them into a prescribed memory area.

Also, in this embodiment, because data for enlarged image are extracted part of data for whole image, in the same manner as data for whole image, they are in a state after a linearity distortion and lens-inherent distortions are corrected. Therefore, even when plural pieces of data for enlarged image are written into the enlarged image memory 34, they are mapped as one piece of enlarged image having their joined parts continuously concatenated.

Note that as mentioned above, in a conventional image processing device, large-capacity frame memory is needed according to the number of camera heads used and the camera resolution. However, in this embodiment, because only the image areas included in the enlarged area are outputted as data for enlarged image, the capacity of the enlarged image memory 34 should only suffice the number of pixels for the maximum image area that can be set as the enlarged area. Therefore, it can be greatly reduced in comparison with the conventional memory capacity.

The enlarged image synthesizing part 35 synthesizes data for enlarged image, and outputs an enlarged image. In this embodiment, based on an enlargement ratio specified through the image control part 36, the enlarged image synthesizing part 35 reads and synthesizes only the image areas written in the enlarged image memory 34, and outputs them as an enlarged image to the enlarged image display device 5. Also, in this embodiment, an image format matching the enlarged image display device 5 is specified by the image control part 36, and the enlarged image memory 34 outputs the enlarged image in that image format.

The image control part 36 controls outputting a whole image and an enlarged image. In this embodiment, the image control part 36 specifies an image format matching the whole image display device 4 when the whole image memory 33 outputs a whole image, and specifies an image format matching the enlarged image display device 5 when the enlarged image synthesizing part 35 outputs an enlarged image.

Also, in this embodiment, as shown in FIG. 1, upon acquiring enlargement information and a control signal from the control part 37, the image control part 36 performs a role of sending them to the camera control part 27 of each multi-eye photographing camera head 2 through the enlarged image synthesizing part 35 and the input processing part 31.

The control part 37 controls all the multi-eye photographing camera heads 2 connected to the image processing device 3. In this embodiment, the control part 37 constantly monitors the operation states of the individual multi-eye photographing camera heads 2, and as shown in FIG. 1, outputs a control signal for performing the operation setting of each multi-eye photographing camera head 2 and enlargement information acquired from the whole image display device 4 to the image control part 36.

The differential area detecting part 38 detects a partial differential area in a whole image. In this embodiment, based on a motion vector signal of the whole image acquired from the whole image memory 33, the differential area detecting part 38 detects a differential area in a whole image, and outputs enlargement information to specify that differential area. Specifically, a threshold to indicate a differential state is set in advance in the differential area detecting part 38, and when a motion vector signal exceeding that threshold is detected, it automatically detects the occurrence of a differential area.

Also, in this embodiment, the motion vector signal includes a write address position in the whole image memory 33. Therefore, the differential area detecting part 38 specifies the enlargement position of the differential area based on the write address position included in the motion vector signal, computes the enlargement ratio based on the size of that differential area, and automatically generates and sends enlargement information consisting of the enlargement position and the enlargement ratio to the control part 37.

Furthermore, in this embodiment, as shown in FIG. 1, upon detecting a differential area, the differential area detecting part 38 sends a warning signal to each of the whole image display device 4 and the differential image recording part 39. Thereby, the fact that a differential area has occurred is displayed on the whole image display device 4, and recording of a differential image that is an enlarged differential area is started in the differential image recording part 39.

The differential image recording part 39 automatically records a differential image. In this embodiment, upon receiving a warning signal from the differential area detecting part 38, the differential image recording part 39 starts and records a differential image outputted from the enlarged image synthesizing part 35 for a prescribed length of time. At this time, in each multi-eye photographing camera head 2, as shown in FIG. 1, based on the enlargement information sent from the differential area detecting part 38, the enlarged area extracting part 28 outputs an image area included in a differential area among data for whole image as data for differential image that constitute part or the whole of the differential image. Then, the enlarged image synthesizing part 35 synthesizes the data for differential image outputted from the enlarged area extracting parts 28, and outputs them as a differential image to the differential image recording part 39.

The whole image display device 4 displays a whole image photographing the whole multi-eye photographing range. In this embodiment, the whole image display device 4 is composed of a touch panel provided with both an input function and a display function, etc., and displays a whole image outputted from the whole image memory 33 and a warning signal outputted from the differential area detecting part 38. Also, the whole image display device 4 inputs to the control part 37 enlargement information consisting of an enlargement position and an enlargement ratio inputted by a user.

The enlarged image display device 5 displays an enlarged image that is an enlarged part of a whole image. In this embodiment, the enlarged image display device 5 is composed of a liquid-crystal display etc., and displays an enlarged image outputted from the enlarged image synthesizing part 35 and a differential image outputted from the differential image recording part 39. Note that although in this embodiment the whole image display device 4 and the enlarged image display device 5 are configured as separate, they are not limited to this configuration, but a whole image and an enlarged image can be displayed on one display device using a picture-in-picture function, a dual-screen display function, a screen-switching function, or the like.

Next, actions by the multi-eye camera system 1, the multi-eye photographing camera heads 2, the image processing device 3, the multi-eye photographing program 2a, and the multi-eye photographing method of this embodiment are explained referring to FIG. 6.

First, when performing multi-eye photography using the multi-eye camera system 1 of this embodiment, stored in advance in the parameter memory part 23 of each of the multi-eye photographing camera heads 2 are correction parameters determined according to the attaching position.

Next, once the partial image acquiring part 24 acquires a partial image photographing a prescribed part (or a portion) in the multi-eye photographing range from the imaging element (S1: Partial image acquisition step), the image correcting part 26 corrects distortions of the partial image, and outputs it as data for whole image to the image processing device 3 (S2: Image correction step). At this time, outputted from the individual multi-eye photographing camera heads 2 are data for whole image whose linearity distortion and lens-inherent distortions are corrected. Therefore, there is no need to correct them in the image processing device 3 side, reducing the processing load of the image processing device 3.

On the other hand, in the image processing device 3, once the input processing part 31 acquires data for whole image from each of the multi-eye photographing camera heads 2 (or individual multi-eye photographing camera heads) (S3: Input processing step), the resizing processing part 32 resizes each of the data for whole image to match the resolution of the whole image display device 4 (S4: Resizing processing step), and writes them into the whole image memory 33. At this time, because correction processes are already performed to those data for whole image, by simply writing them to the whole image memory 33 according to their specified addresses, a whole image where they are joined continuously without incongruity is mapped.

Also, in this embodiment, unlike a conventional image processing device, because frame memory is not needed for writing images from all the camera heads as they are in a high resolution, the image processing device 3 allows miniaturization, power saving, and cost reduction. Furthermore, in designing a system as well, because there is no need to be concerned about the number of units of the multi-eye photographing camera head 2, the whole multi-eye camera system 1 can be easily optimized.

Next, the whole image memory 33 synthesizes all data for whole image, and outputs them as a whole image to the whole image display device 4 (S5: Whole image output step). Thereby, the whole image is displayed on the whole image display device 4, which allows specifying easily the enlargement position and the enlargement ratio of desired part to enlarge while viewing that whole image.

Subsequently, in this embodiment, because a differential state automatic detection function is provided, the differential area detecting part 38 judges whether a differential area exists in the whole image (S6: Differential area detection step). As a result of that judgement, if no differential area is detected (S6: NO), it waits for an input of enlargement information from the user (S7), and if there is no such input (S7: NO), returns to S6.

On the other hand, in S6, if the differential area detecting part 38 detects a differential area (S6: YES), or if enlargement information is inputted from the user (S7: YES), the enlargement information specifying the differential area or the enlargement information specified by the user is sent to the individual multi-eye photographing camera heads 2 from the image processing device 3 (S8: Enlargement information sending step). Below, because the process when the enlargement information specified by the user is sent, and the process when the enlargement information of the differential area is sent are substantially the same processes, the latter is indicated in square parentheses and its explanations are omitted.

In each multi-eye photographing camera head 2, once the camera control part 27 acquires enlargement information (S9: Enlargement information acquisition step), based on that enlargement information, the enlarged area extracting part 28 judges whether an image area included in the enlarged area [differential area] exists among data for whole image (S10: Enlarged area judgement step). As a result of that judgement, if no image area included in the enlarged area [differential area] exists (S10: NO), the enlarged area extracting part 28 ends this process without outputting data for enlarged image [data for differential image].

On the other hand, as a result of the judgement in S10, if an image area included in the enlarged area [differential area] exists (S10: YES), the enlarged area extracting part 28 extracts that image area, and outputs it as data for enlarged image [data for differential image] to the image processing device 3 (S11: Data for enlarged image output step). Thereby, only the image area included in the enlarged area [differential area] is outputted as data for enlarged image [data for differential image], therefore the capacity of the enlarged image memory 34 only needs to suffice the number of pixels for the maximum image area that can be set as the enlarged area. That is, the capacity needed for the enlarged image memory 34 is reduced without degrading the image quality of the enlarged image.

In the image processing device 3, upon acquiring data for enlarged image [data for differential image] from one or more of the multi-eye photographing camera heads 2 (S12: Data for enlarged image acquisition step), they are written directly into the enlarged image memory 34. At this time, in the same manner as data for whole image, because correction processes are already performed to the data for enlarged image [data for differential image], simply writing them into the enlarged image memory 34 can map an enlarged image [differential image] having them joined continuously without incongruity.

Subsequently, the enlarged image synthesizing part 35 synthesizes individual data for enlarged image [individual data for differential image], and outputs an enlarged image [differential image] to the enlarged image display device 5 (S13: Enlarged image output step). Thereby, the user can display a desired enlarged image easily and speedily on the enlarged image display device 5 while viewing a whole image displayed on the whole image display device 4. Therefore, when performing a monitoring work using the multi-eye camera system 1 of this embodiment, there is no dead angle in the monitoring range, reducing the work load of a monitor.

Also, in this embodiment, because the differential state automatic detection function is provided, once a differential state occurs, it is automatically detected, a differential image is displayed on the enlarged image display device 5, and that differential image is automatically recorded in the differential image recording part 39 (S14: Differential image recording step). Therefore, the monitoring work load is further reduced, and the differential image is securely recorded.

By such multi-eye camera system 1, multi-eye photographing camera heads 2, image processing device 3, multi-eye photographing program 2a, and multi-eye photographing method of this invention as mentioned above, the following effects are achieved.
1. Miniaturization, power saving, and cost reduction of the image processing device 3 can be achieved by reducing its processing load, and the whole system can be easily optimized.
2. The capacity of the enlarged image memory 34 can be reduced without degrading the enlarged image quality.
3. A differential area can be automatically detected, and its enlarged image can be automatically recorded.
4. Because the image processing device 3 can be miniaturized, it can be configured as one unit including all the multi-eye photographing camera heads 2.
5. By integrating them into one unit, all assembly works and electric adjustments can be concluded in a factory, allowing simplification of on-site installation and adjustment works of the multi-eye photographing camera heads 2.
6. If applied to a monitoring work, the monitoring work load can be reduced, and the monitoring accuracy can be improved.

Note that the multi-eye camera system 1 of this invention is not limited to the above-mentioned embodiment but can be modified as appropriate.

For example, a synchronizing signal generating circuit that generates a synchronizing signal can be installed in the image processing device 3, and all the multi-eye photographing camera heads 2 can be synchronized by that synchronizing signal outputted from that synchronizing signal generating circuit. Thereby, all the multi-eye photographing camera heads 2 operate in a synchronized state, therefore no time shift occurs among individual data for whole image written into the whole image memory 33 or individual data for enlarged image written into the enlarged image memory.

Also, a time code generating circuit that generates a time code can be installed in the image processing device 3, and the time code can be supplied to each of the whole image memory 33 and the enlarged image synthesizing part 35. Thereby, time information can be inserted to each of whole images and enlarged images. Note that if a GPS receiver is connected to the synchronizing signal generating circuit or the time code generating circuit mentioned above, time accuracy of the time code can be improved.

EXPLANATIONS OF CODES

1: Multi-eye camera system
2: Multi-eye photographing camera heads
2a: Multi-eye photographing program
3: Image processing device
4: Whole image display device
5: Enlarged image display device
21: Program memory part
22: Image memory
23: Parameter memory part
24: Partial image acquiring part
25: Image quality processing part
26: Image correcting part
27: Camera control part
28: Enlarged area extracting part
31: Input processing part
32: Resizing processing part
33: Whole image memory
34: Enlarged image memory
35: Enlarged image synthesizing part
36: Image control part
37: Control part
38: Differential area detecting part
39: Differential image recording part

The invention claimed is:

1. A multi-eye camera system, comprising:
multi-eye photographing camera heads that each capture a partial image that forms a corresponding part of a whole image when synthesized based on an attaching positions thereof, and
an image processing device to which a plurality of the multi-eye photographing camera heads are connected and which synthesizes partial images received from the multi-eye photographing camera heads to form the whole image, wherein
each of the multi-eye photographing camera heads is provided with
a single lens and a single image element,
a partial image acquiring part that acquires a partial image photographing prescribed part in a multi-eye photographing range from the image element,
a parameter memory part that stores correction parameters, which is determined according to the attaching position of the corresponding multi-eye photographing camera head, and is used to correct distortions of the partial image,
an image correcting part that corrects distortions of the partial image using the correction parameters, outputs the partial image in which the distortions have been corrected to the image processing device which is separated from the multi-eye photographing camera heads as data for whole image that constitute part of a whole image, and makes the image processing device synthesize the data for whole image as the whole image,
a camera control part that acquires enlargement information from the image processing device, and
an enlarged area extracting part that extracts at least a portion of the partial image of the corresponding one of the corresponding multi-eye photographing camera head based on the enlargement information, and
the image processing device which is separated from the multi-eye photographing camera heads is provided with an input processing part that acquires the data for whole image corrected by the image correcting part from all the connected multi-eye photographing camera heads, a resizing processing part that resizes all the data for whole image acquired by the input processing part to match resolution of a whole image display device, and a whole image memory that synthesizes all the data for whole image resized by the resizing processing part, and outputs the synthesized data for the whole image to the whole image display device, wherein when the camera control part receives an instruction to display an enlarged image of a part of the whole image that has been synthesized, the camera control part of each of the multi-eye photographing camera heads acquires, from the image processing device, the enlargement information specifying the part of the whole image to be enlarged according to the instruction, the enlarged area extracting part of each of the multi-eye photographing camera heads determines whether the part of the whole image to be enlarged is included in the partial image captured by the corresponding multi-eye photographing camera head, and when it is determined that the part of the whole image to be enlarged is included in the partial image, the enlarged area extracting part of the corresponding one or more of the multi-eye photographing camera heads that has captured the partial image including the part of the whole image to be enlarged extracts a corresponding portion of the part of the whole image to be enlarged from the partial image captured by the corresponding one or more of the multi-eye photographing camera heads based on the enlargement information, and outputs the extracted portion of the partial image as data for enlarged image to the image processing device to allow the image processing device to synthesize the outputted extracted portion of the partial image to form an enlarged image of the part of the whole image.

2. The multi-eye camera system according to claim 1, wherein the image processing device is further provided with an enlarged image memory that acquires the data for the enlarged image from the corresponding one or more of the multi-eye photographing camera heads, and an enlarged image synthesizing part that synthesizes the data for enlarged image acquired by the enlarged image memory, and outputs the synthesized data as the enlarged image to an enlarged image display device.

3. A multi-eye photographing camera head used for multi-eye photography, comprising:

a single lens and a single image element, a partial image acquiring part that acquires a partial image photographing prescribed part in a multi-eye photographing range from the image element, a parameter memory part that stores correction parameters, which is determined according to the attaching position of the corresponding multi-eye photographing camera head and is used to correct distortions of the partial image, an image correcting part that corrects distortions of the partial image using the correction parameters, outputs the partial image in which the distortions have been corrected to an image processing device which is separated from the multi-eye photographing camera heads as data for whole image that constitute part of a whole image, and makes the image processing device synthesize the data for whole image as the whole image, a camera control part that acquires enlargement information from the image processing device, and an enlarged area extracting part that extracts a portion of the partial image of the corresponding one of the corresponding multi-eye photographing camera head based on the enlargement information, wherein when the camera control part receives an instruction to display an enlarged image of a part of the whole image that has been synthesized, the camera control part acquires, from the image processing device, the enlargement information specifying the part of the whole image to be enlarged according to the instruction, the enlarged area extracting part determines whether the part of the whole image to be enlarged is included in the partial image, and when it is determined that the part of the whole image to be enlarged is included in the partial image, the enlarged area extracting part extracts a corresponding portion of the part of the whole image to be enlarged from the partial image based on the enlargement information, and outputs the extracted portion of the partial image as data for enlarged image to the image processing device for synthesizing the outputted extracted portion of the partial image to form an enlarged image of the part of the whole image.

4. An image processing device configured separately from the multi-eye photographing camera head according to claim 3 and to which a plurality of the multi-eye photographing camera heads are connected, comprising:

an input processing part that acquires the data for whole image corrected by the image correcting part from all the connected multi-eye photographing camera heads, a resizing processing part that resizes all the data for whole image acquired by the input processing part to match resolution of a whole image display device, and a whole image memory that synthesizes all the data for whole image resized by the resizing processing part, and outputs the synthesized data as the whole image to the whole image display device.

5. An image processing device to which a plurality of the multi-eye photographing camera heads according to claim 3 are connected, comprising:

an input processing part that acquires the data for whole image corrected by the image correcting part from all the connected multi-eye photographing camera heads, a resizing processing part that resizes all the data for whole image acquired by the input processing part to match resolution of a whole image display device, a whole image memory that synthesizes all the data for whole image resized by the resizing processing part, and outputs the synthesized data as the whole image to the whole image display device, an enlarged image memory that acquires the data for enlarged image from one or more of the multi-eye photographing camera heads, and an enlarged image synthesizing part that synthesizes the data for enlarged image acquired by the enlarged image memory, and outputs the synthesized data as the enlarged image to an enlarged image display device.

6. The image processing device according to claim 5, comprising:

a differential area detecting part that detects a differential area in the whole image based on a motion vector signal of the whole image acquired from the whole image memory, and outputs enlargement information for outputting the differential area as an enlarged differential image to the enlarged area extracting part, and a differential image recording part that acquires and records the differential image when the enlarged area extracting part has outputted an image area included in the differential area among the data for whole image as data for differential image that constitute part or the whole of a differential image based on the enlargement information, and the enlarged image synthesizing part has synthesized the data for differential image and outputted the synthesized data as the differential image.

7. A non-transitory computer-readable recording medium storing a multi-eye photographing program used for multi-eye photography that makes a multi-eye photographing camera head which is provided with a single lens and a single image element function as a partial image acquiring part that acquires a partial image photographing prescribed part in a multi-eye photographing range from the imaging element, a parameter memory part that stores correction parameters, which is determined according to the attaching position of the corresponding multi-eye photographing camera head and is used to correct distortions of the partial image, an image correcting part that corrects distortions of the partial image using the correction parameters, outputs the partial image in which the distortions have been corrected to an image processing device which is separated from the multi-eye photographing camera heads as data for whole image that constitute part of a whole image, and makes the image processing device synthesize the data for whole image as the whole image, a camera control part that acquires enlargement information from the image processing device, and an enlarged area extracting part that extracts a portion of the partial image of the corresponding one of the corresponding multi-eye photographing camera head based on the enlargement information, wherein when the camera control part receives an instruction to display an enlarged image of a part of the whole image that has been synthesized, the camera control part acquires, from the image processing device, the enlargement information specifying the part of the whole image to be enlarged according to the instruction, the enlarged area extracting part determines whether the part of the whole image to be enlarged is included in the partial image, and when it is determined that the part of the whole image to be enlarged is included in the partial image, the enlarged area extracting part extracts a corresponding portion of the part of the whole image to be enlarged from the partial image based on the enlargement information, and outputs the extracted portion of the partial image as data for enlarged image to the image processing device for synthesizing the outputted extracted portion of the partial image to form an enlarged image of the part of the whole image.

8. A multi-eye photographing method using a multi-eye photographing camera head which is provided with a single lens and a single image element, and is used for multi-eye photography, comprising:

acquiring a partial image photographing prescribed part in a multi-eye photographing range from the imaging element, correcting distortions of the partial image using correction parameters, which is determined according to the attaching position of the corresponding multi-eye photographing camera head and is used to correct distortions of the partial image, output the partial image in which the distortions have been corrected to an image processing device which is separated from the multi-eye photographing camera heads as data for whole image that constitute part of a whole image, and makes the image processing device synthesize the data for whole image as the whole image, extracting a portion of the partial image of the corresponding one of the corresponding multi-eye photographing camera head based on the enlargement information, receiving, from the image processing device, an instruction to display an enlarged image of a part of the whole image that has been synthesized, acquiring, from the image processing device, enlargement information specifying the part of the whole image to be enlarged according to the instruction, determining whether the part of the whole image to be enlarged is included in the partial image, and when it is determined that the part of the whole image to be enlarged is included in the partial image, extracting a corresponding portion of the part of the whole image to be enlarged from the partial image based on the enlargement information, and outputting the extracted portion of the partial image as data for enlarged image to the image processing for synthesizing the outputted extracted portion of the partial image to form an enlarged image of the part of the whole image.

* * * * *